(12) United States Patent
Baetz et al.

(10) Patent No.: US 7,578,537 B2
(45) Date of Patent: Aug. 25, 2009

(54) MOTOR VEHICLE SEAT

(75) Inventors: Harald Baetz, Rodach (DE); Jochen Hofmann, Marktgraitz (DE)

(73) Assignee: Brose Fahrzeugteile GmbH & Co KG, Coburg, Coburg (DE)

(*) Notice: Subject to any disclaimer, the term of this patent is extended or adjusted under 35 U.S.C. 154(b) by 130 days.

(21) Appl. No.: 10/583,243

(22) PCT Filed: Dec. 16, 2004

(86) PCT No.: PCT/DE2004/002785
§ 371 (c)(1),
(2), (4) Date: Mar. 2, 2007

(87) PCT Pub. No.: WO2005/058636
PCT Pub. Date: Jun. 30, 2005

(65) Prior Publication Data
US 2007/0252403 A1    Nov. 1, 2007

(30) Foreign Application Priority Data
Dec. 17, 2003  (DE) .................. 203 19 816

(51) Int. Cl.
*B60N 2/14* (2006.01)
(52) U.S. Cl. .................. 296/65.09; 296/65.05
(58) Field of Classification Search .............. 296/65.01, 296/65.05, 65.06, 65.16, 65.09; 297/13, 297/331, 332, 334
See application file for complete search history.

(56) References Cited

U.S. PATENT DOCUMENTS 4,632,457 A  12/1986  Hofrichter et al.
4,652,051 A  3/1987  Maruyama
4,736,985 A  4/1988  Fourrey et al.

(Continued)

FOREIGN PATENT DOCUMENTS

DE  42 24 427 A1  1/1994

(Continued)

OTHER PUBLICATIONS

English Translation of the International Preliminary Report on Patentability for PCT/DE2004/002785 dated Sep. 8, 2006, 8 pgs.

(Continued)

*Primary Examiner*—Dennis H Pedder
*Assistant Examiner*—Melissa A Black
(74) *Attorney, Agent, or Firm*—Christie, Parker & Hale, LLP

(57) ABSTRACT

A motor vehicle seat comprising a backrest provides a support for the back of a seat occupant when in the position of use, and a pivotally mounted upholstery carrier for seat upholstery, defining a seat surface for a seat occupant when in the position of use, in addition to a folding mechanism for folding the upholstery carrier in front of the backrest such that the upholstery carrier extends substantially along the backrest when the latter is in the position of use. The folding mechanism comprises a pair of levers, wherein both levers are hingedly coupled to each other at a knee joint, forming an acute angle at said knee joint, and such that the acute angle is transformed into a reflex angle when the upholstery carrier is folded out of the position of use in front of the backrest.

36 Claims, 5 Drawing Sheets

U.S. PATENT DOCUMENTS

| | | |
|---|---|---|
| 5,564,780 A | 10/1996 | Presser et al. |
| 5,626,391 A | 5/1997 | Miller et al. |
| 5,647,634 A | 7/1997 | Presser et al. |
| 5,671,948 A | 9/1997 | Susko et al. |
| 6,030,042 A | 2/2000 | Bauer et al. |
| 6,048,030 A * | 4/2000 | Kanda et al. ............... 297/341 |
| 6,595,588 B2 * | 7/2003 | Ellerich et al. ............. 297/331 |

FOREIGN PATENT DOCUMENTS

| | | |
|---|---|---|
| DE | 44 10 573 A1 | 10/1994 |
| DE | 197 25 365 A1 | 12/1998 |
| DE | 199 43 454 C1 | 1/2001 |
| GB | 2 268 877 | 1/1994 |
| GB | 2 268 877 A | 1/1994 |
| JP | 61-193938 A | 8/1986 |
| JP | 61193938 | 8/1986 |

OTHER PUBLICATIONS

International Search Report, dated Apr. 5, 2005, corresponding to PCT/DE2004/002785.

* cited by examiner

MOTOR VEHICLE SEAT

CROSS-REFERENCE TO A RELATED APPLICATION

This application is a National Phase Patent Application of International Application Number PCT/DE2004/002785, filed on Dec. 16, 2004, which claims priority of German Utility Model Number 203 19 816.6, filed on Dec. 17, 2003.

BACKGROUND

The invention relates to a motor vehicle seat.

A motor vehicle seat of this type comprises a backrest which, in its upright use position (generally slightly inclined to the rear with respect to the vertical), forms a support for a seat user's back and which can, if appropriate, also be brought (pivoted) into further use positions inclined more greatly to the rear; a pivotably mounted cushion carrier for a seat cushion which, in its use position, defines a seat surface for a seat user; and a folding mechanism for folding over the cushion carrier to in front of the backrest, so that the cushion carrier essentially extends along the backrest in its upright functional position.

The cushion carrier may be, in particular, a "seat trough" or seat shell for receiving a seat cushion which, in its horizontal use position or use position which is somewhat inclined with respect to the horizontal, together with the seat cushion situated thereon, defines a seat surface on which a seat user can sit.

Owing to the fact that the cushion carrier of a motor vehicle seat of the generic type can be folded in the manner of a cinema chair ("cinema chair function") into an upright (essentially vertical) position, additional storage space can be created in front of the motor vehicle seat.

In order to ensure that the cushion carrier, after being folded over, remains in its folded upward position, it is known to lock the cushion carrier in its folded upward position by a lock. However, this requires additional construction space for the lock and leads to an increase of the weight of the motor vehicle seat. Furthermore, the lock actuation required to unlock it reduces the operating convenience of the arrangement.

The invention is therefore based on the problem of further improving a motor vehicle seat of the type mentioned at the beginning, in particular of ensuring, by simple means, that the cushion carrier is locked in its folded upward position.

BRIEF DESCRIPTION

This problem is achieved according to the invention firstly by the provision of a motor vehicle seat with the features of claim 1.

According thereto, the folding mechanism with which the cushion carrier can be folded into an upright position comprises a pair of levers, the two levers of which are connected to each other in an articulated manner at a knee joint, the two levers of the pair of levers first of all enclosing an acute angle at each knee joint in a use position of the cushion carrier, which acute angle, when the cushion carrier is folded over from the use position into the essentially upright position in front of the backrest, is transformed into a reflex angle.

By going beyond the (neutral) angular position of 180°, i.e. by the transforming of an initially acute angle (bounded by the two levers of the pair of levers) into a reflex angle, the pair of levers takes up a new stable position which cannot readily be moved back again by the weights acting on the cushion carrier into the previous state in which the two levers enclose an acute angle and the cushion carrier was in its (essentially) horizontal) use position.

In this case, means are preferably provided which limit the maximum achievable (reflex) angle between the two levers of the pair of levers by, when a reflex angle with a defined value of greater than 180° is achieved, a further increase of this angle being prevented. For example, a stop is suitable for this, the stop limiting the possible movement of at least one lever of the pair of levers during the folding over of the cushion carrier into an upright position.

The pair of levers is preferably designed as a pair of articulated levers, the one lever of which is coupled pivotably to the cushion carrier and the other lever of which can be coupled pivotably to a floor subassembly of the corresponding motor vehicle. In this case, the coupling points of the two levers and the knee joint thereof are arranged in such a manner with respect to the pivot axis of the cushion carrier (about which the cushion carrier can be folded) that, when the angle of 180° is exceeded during the folding upward of the cushion carrier, a folding back of the cushion carrier under the action of the weights acting on the cushion carrier is not possible. On the contrary, weights which act on the folded upward cushion carrier have the tendency to further enlarge the reflex angle between the two levers of the pair of levers and, as a result, to release a clamping of the arrangement.

This prevents a return of the cushion carrier into the use position due to the forces acting on the folded upward cushion carrier.

According to another aspect of the invention which can advantageously be combined with the abovementioned variant of the invention, according to claim 3 a guide device is provided in one of the levers of the pair of levers, in particular in the form of a guide slot in which the knee joint of the pair of levers is guided, the guide device having a point of discontinuity over which the knee joint moves when the cushion carrier is folded from a use position to in front of the backrest. By the point of discontinuity, which can be designed in particular as a bend in the guide device, a folding of the cushion carrier back into the use position is prevented by the guide device being angled at the point of discontinuity (bend) in such a manner that a moving over the point of discontinuity by the knee joint due to the weights acting on the folded upward cushion carrier is prevented.

Both variants of the invention are based on the common technical principle that a locking of the folded upward cushion carrier in relation to weights or acceleration forces acting on the cushion carrier takes place by moving over a point of discontinuity, namely, in the one case, by moving over the angular position of 180° between the two levers of the front pair of levers and, in the other case, by moving over a point of discontinuity, formed in particular by a bend, of a guide device on one lever of the pair of levers.

In order to limit the pivoting movement during the folding upward of the cushion carrier to in front of the backrest of the motor vehicle seat, i.e. in order to limit the adjustment distance passed through in this case, a stop can be provided which, for example, limits the movement of one lever of the pair of levers, to be precise, in particular, the movement of a lever of the pair of levers that is to be coupled to a floor subassembly of the motor vehicle.

According to an embodiment of the invention, the stop is to be provided on the floor subassembly of the motor vehicle. According to another embodiment of the invention, the stop is provided on the other of the two levers and can be formed, in particular, by an end stop of a guide device which is provided in the corresponding lever and in which the knee joint of the pair of levers is guided, with that end stop preferably being formed behind a point of discontinuity (bend) of the guide device in an angled end section of the corresponding lever.

A guide device is understood here generally to mean a guide means in which the joint of the corresponding pair of levers can be guided. This can be, for example, a guide slot, in particular in the form of an elongated hole; however, a design of the guide device as a guide rail, as a guide web, as a U-shaped guide in cross section etc. is also possible.

To fold the cushion carrier back into the use position, it is possible, for example, for an actuating element in the form of an actuating loop or an actuating handle to be provided on one lever of the pair of levers, to be precise in particular on the (upper) lever connected to the cushion carrier.

In order to keep the cushion carrier in its upright position, in which it essentially extends in front of the backrest of the corresponding vehicle seat, elastic means can be provided which act on at least one of the levers and oppose a resetting movement of the cushion carrier.

Use is made here of the fact that, when the cushion carrier is folded upward into an upright position, an initially acute angle bounded by the two levers is transformed into a reflex angle. This permits such an arrangement and design of the elastic means that the latter prevent a resetting movement of the two levers from the reflex angle to an acute angle.

According to an embodiment of the invention, the elastic means are arranged on the knee joint, for example in the form of a torsion spring which loops around the joint and acts with its two legs each on one of the two levers.

According to another embodiment of the invention, the elastic means are a linear spring which acts on specifically one of the two levers, in particular on the (lower) lever to be connected to the floor subassembly of the motor vehicle. The linear spring is preferably designed here as a helical spring in the form of a tension spring.

Finally, the elastic forces may also be applied by an interaction of the backrest cushion with the seat cushion when they interact in the folded upward position of the cushion carrier.

In the use position of the cushion carrier, the knee joint is preferably supported on a floor subassembly of the vehicle and is raised from the floor subassembly into a vertical position during the folding upward of the cushion carrier.

According to a particularly preferred development of the invention, to obtain additional storage space above the seat the backrest can also be folded forward onto the cushion carrier in its use position. In the case of a vehicle seat of this type there is therefore alternatively the possibility of providing additional storage space in front of the seat by folding the cushion carrier upward or of providing additional storage space above the seat by folding the backrest forward in the direction of the seat cushion.

In order in this case to maximize the storage space to be provided above the seat, it is advantageous, when folding the backrest forward in the direction of the seat surface, at the same time to lower the cushion carrier. For this purpose, the pivot axis of the cushion carrier, about which the latter can be folded into its upright position, is formed on a rear lever which is mounted by its end facing away from the pivot axis of the cushion carrier on a floor subassembly of the motor vehicle. Pivoting of this rear lever which acts on the pivot axis of the cushion carrier enables the cushion carrier to be lowered. In order to coordinate a pivoting of the rear lever and therefore a lowering of the cushion carrier with the folding forward of the backrest, a coupling lever is provided which is coupled, on the one hand, to the backrest and, on the other hand, to said rear lever. During the folding of the backrest forward in the direction of the seat surface, this coupling lever acts on the rear lever of the cushion carrier, so that, during the folding forward of the backrest, a pivoting movement of said rear lever takes place, which leads to a simultaneous lowering of the cushion carrier.

As an alternative or in addition to the transforming of an initially acute angle between the two levers of the front pair of levers into a reflex angle, it can be provided to guide the knee joint of the front pair of levers in a guide device which has a point of discontinuity (for example in the form of a bend) over which the joint moves directly before reaching the sought-for folded upward (upright) position of the cushion carrier. For this purpose, the guide device can be configured as a guide slot in accordance with the keyhole principle or can interact with the joint guided therein in the manner of in the manner of a bayonet catch, so that, in the folded upward state of the cushion carrier, the joint is received in a region of the slotted guide mechanism on the far side of the point of discontinuity and is held in a stable position. The pair of levers is therefore stabilized in a defined position and the cushion carrier is held in an upright, folded upward position.

BRIEF DESCRIPTION OF THE DRAWINGS

Further features and advantages of the invention will become clear in the description below of an exemplary embodiment with reference to the figures.

In the figures:

FIG. 1 shows a motor vehicle seat, in particular rear seat, with a cushion carrier T in the form of a seat trough or seat shell which bears a seat cushion S which defines a seat surface F for a seat user. Furthermore, the vehicle seat has a backrest R which is mounted pivotably about an axis A, has a backrest frame G with a backrest cushion L arranged thereon for supporting a seat user's back and bears a head restraint K. In the state shown in FIG. 1, the backrest R is in an upright use position in which it is generally inclined slightly to the rear with respect to the vertical.

In its central region (as viewed in the seat longitudinal direction x), the cushion carrier T is connected in an articulated manner to the floor subassembly B of a motor vehicle via a pair of articulated levers 1 and, in its rear region (again as viewed in the seat longitudinal direction x), is additionally connected in an articulated manner to the floor subassembly B via a rear pivot lever 2, the rear pivot lever 2, at its end facing the cushion carrier T, at the same time defining a pivot axis 20 of the cushion carrier T.

Figure 1:
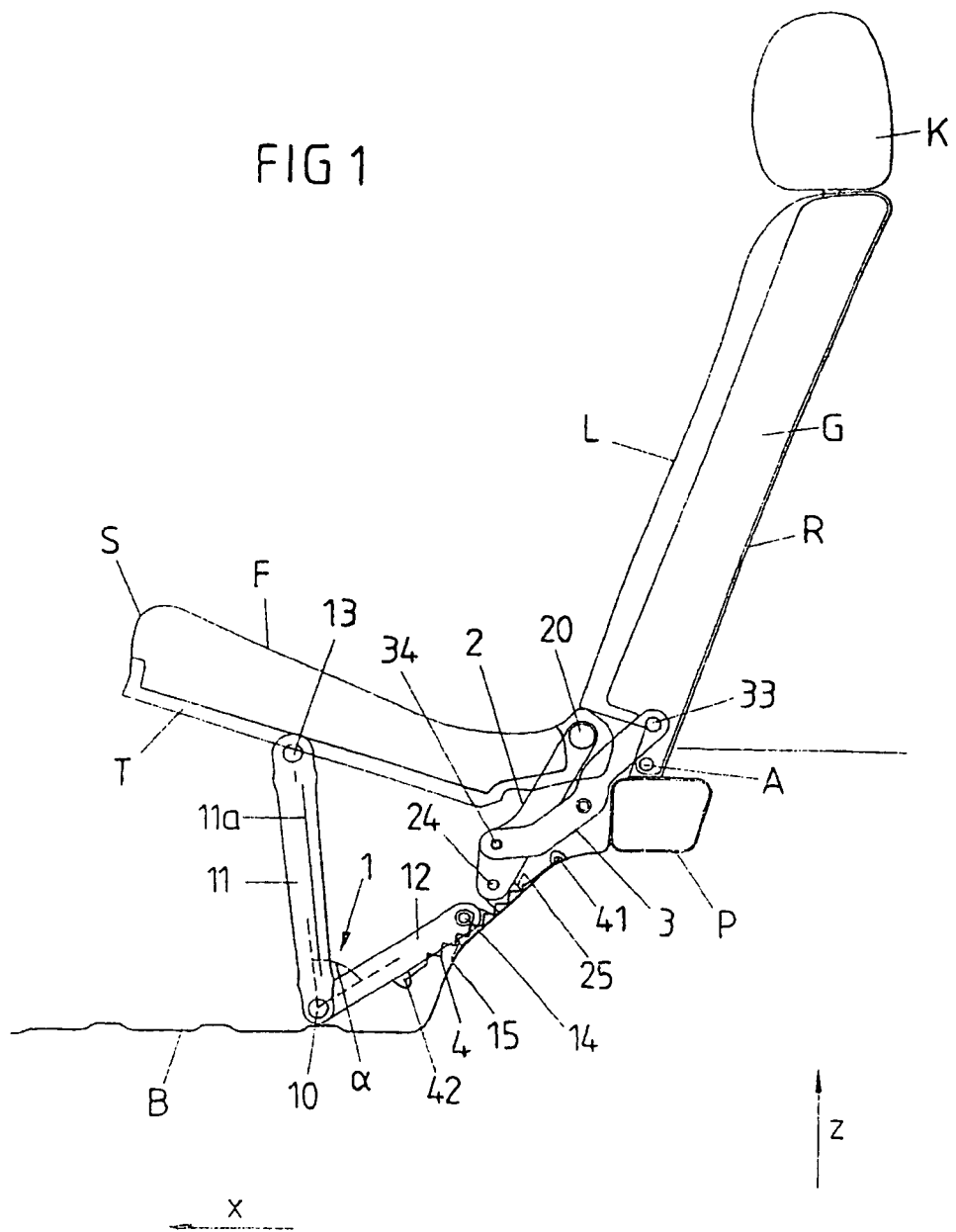
FIG. 1 shows a motor vehicle seat with a backrest which can be folded forward onto the seat surface and a cushion carrier, which can be folded in front of the upright backrest, for a seat cushion, in each case in their use position.

The front pair of articulated levers 1 comprises a primary pivot lever 11 which, on the one hand, is coupled pivotably by a first, upper end via a joint 13 pivotably to the cushion carrier T in its central region (as viewed in the seat longitudinal direction x) and, on the other hand, is connected in an articulated manner by its other, lower end via a knee joint 10 to the secondary pivot lever 12 of the pair of articulated levers 1. The secondary pivot lever 12 is coupled in turn pivotably to the floor subassembly B of the motor vehicle by its end facing away from the knee joint 10, via a bearing bracket 15 and a joint 14 provided there. In the use position of the cushion carrier T which is shown in FIG. 1 and in which the cushion carrier is inclined somewhat with respect to the horizontal, the knee joint 10 is supported on the floor subassembly B and can be locked there, if appropriate releasably.

The secondary pivot lever 12 of the front pair of articulated levers 1 is held by a spring element 4 in the form of a tension spring, designed as a helical spring, in the position in which the knee joint 10 provided at the one end of the secondary pivot lever 12 is supported on the floor subassembly B. For this purpose, the spring element 4 is fixed (attached) by one end 41 to the floor subassembly B and is fixed (attached) by the other end to the other end of the secondary pivot lever 12.

The rear pivot lever 2, via which the cushion carrier T is connected in an articulated manner in the region of its rear end (as viewed in the vehicle longitudinal direction x) to the floor subassembly B, is likewise coupled pivotably to the floor subassembly B via a bearing bracket 25 and a joint 24 provided there. The rear pivot lever 2 is connected by its other end, which faces away from the floor subassembly B, to the cushion carrier T via a joint which at the same time defines the pivot axis 20 of the cushion carrier T that is situated directly below the backrest R.

The rear pivot lever 2 is in turn connected to the backrest frame G of the backrest R via a coupling lever 3 which is coupled by its one end via a joint 33 to the backrest frame G and by its other end via a joint 34 to the rear pivot lever 2.

The state of use of the motor vehicle seat that is shown in FIG. 1 is firstly characterized by the profile, already described, of the cushion carrier T and of the seat surface F with a slight inclination with respect to the seat longitudinal direction or vehicle longitudinal axis x, so that a vehicle occupant can sit down thereon, and secondly by an essentially upright extent of the backrest R, which is only slightly inclined with respect to the vertical z, above a pillar P of the floor subassembly B, so that the backrest cushion L can serve to support a seat user's back.

Figure 2:
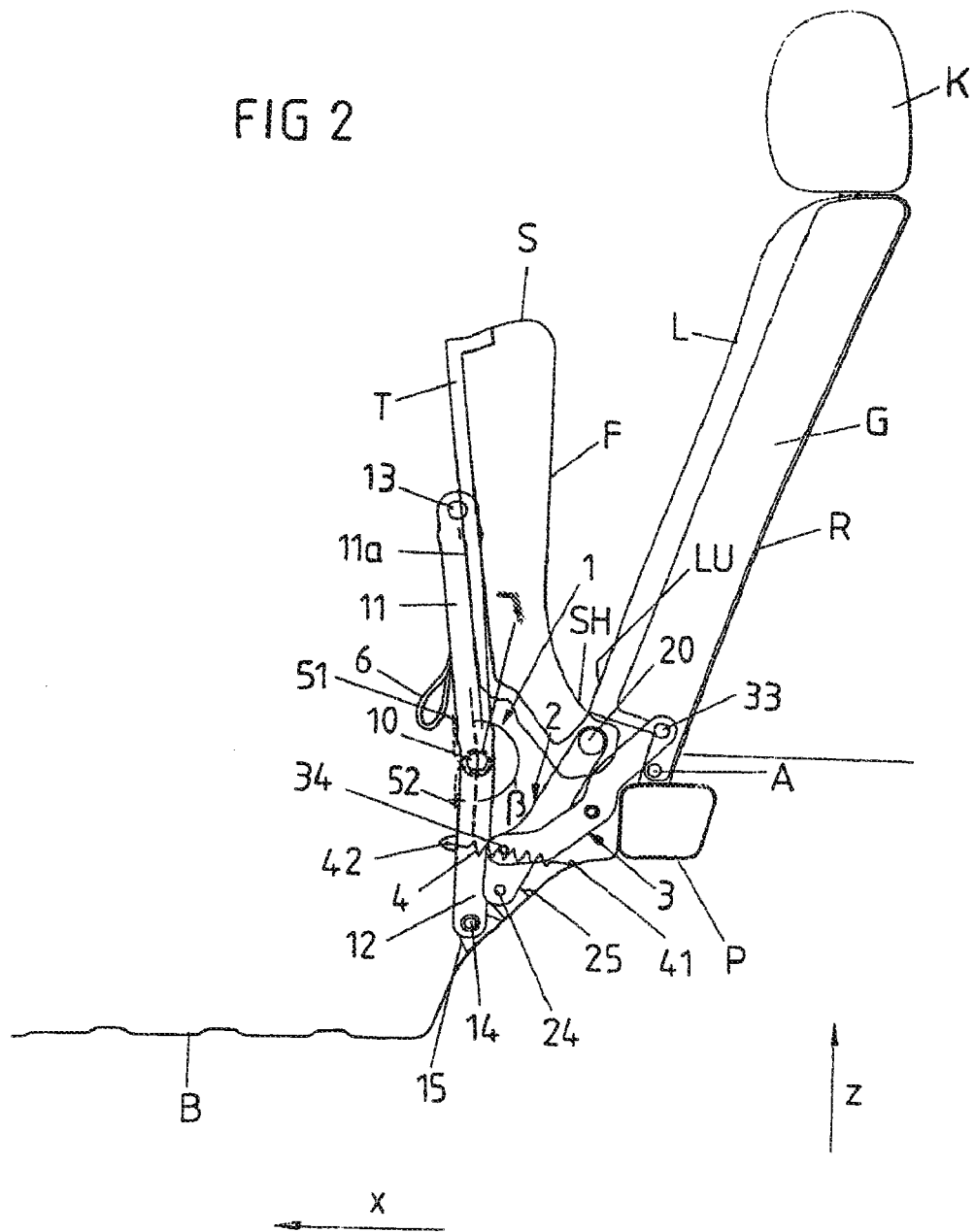
FIG. 2 shows the motor vehicle seat from FIG. 1 after the cushion carrier has been folded upward in front of the backrest.

FIG. 2 shows the vehicle seat from FIG. 1 after the "cinema chair function" has been carried out, i.e. after the cushion carrier T together with the seat cushion S have been folded upward in front of the backrest R and its backrest cushion L. This is made possible by a pivoting of the cushion carrier T about the pivot axis 20 at the upper end of the rear pivot lever 2, with the pair of articulated levers 1 being moved in such a manner that the two pivot levers 11, 12 of the pair of articulated levers 1, which enclose an acute angle α in the state of use of the vehicle seat shown in FIG. 1, now form a reflex angle β of somewhat more than 180°.

As a result of the cushion carrier T being folded upward, the knee joint 10 and the two further joints 13, 14 of the front pair of articulated levers 1 take up such a position with respect to each other that forces which act on the cushion carrier T and which have the tendency to fold the latter forward again about its pivot axis 20 in the direction of its use position, would lead to an enlargement of the reflex angle β between its two pivot levers 11, 12. However, this is not possible, since the secondary pivot lever 12 of the front pair of articulated levers 1 is limited in its movement by the bearing bracket 25, which acts as a stop. For this, the lower end of the rear pivot lever 2. This makes it impossible for the two pivot levers 11, 12 of the front pair of articulated levers 1 to buckle further so as to further enlarge the reflex angle β. In this case, according to one embodiment, the cushion carrier T can be supported on a stop 11a provided on the primary pivot lever 11 of the pair of articulated levers.

A pivoting movement solely of the primary pivot lever 11 of the pair of articulated levers 1 forward about the knee joint 10 (which would likewise have the consequence of the cushion carrier T folding back into its use position) therefore cannot take place because the knee joint 10 and the pivot axis 20 of the cushion carrier T spread out, so that a common pivoting movement of the primary pivot lever 11 of the front pair of articulated levers 1 and of the cushion carrier T about the particular pivot axis 10 or 20 is not possible.

A folding back of the cushion carrier T into its use position with renewed formation of an acute angle α of the two pivot levers 11, 12 of the front pair of articulated levers 1 is furthermore prevented in that, in the folded upward position of the cushion carrier T, the backrest cushion L, in a lower section LU, engages over the rear region SH of the seat cushion S and rests thereon, so that elastic forces which oppose a folding back of the cushion carrier T together with the seat cushion S into the use position act between the two cushions L, S.

Furthermore, the spring element 4, which is designed as a linear spring and acts on the secondary pivot lever 12 of the front pair of articulated levers 1, now acts on said pivot lever in such a manner that it has the tendency to maintain a reflex angle β between the two pivot levers 11, 12 of the front pair of articulated levers 1 by it pulling the secondary pivot lever 12 against the bearing bracket 25 acting as a stop.

If the cushion carrier T is adequately stabilized in its state in which it is folded upward in front of the backrest R just by the fixing (clamping) of the joints 10, 13, 14 of the front pair of articulated levers 1 and/or by the interaction of the backrest cushion L with the seat cushion S, then the additional spring element 4 which acts on the rear pivot lever 2 can be omitted.

Furthermore, instead of a spring element 4 in the form of a linear spring, a torsion spring may also be used in order to stabilize the two pivot levers 11, 12 of the front pair of articulated levers 1 in the position in which they form a reflex angle β and in which the cushion carrier T extends essentially upright along the backrest R. A torsion spring 7 which is suitable for this and is indicated by dashed lines in FIG. 2 is arranged on the knee joint 10 of the front pair of articulated levers 1 and is supported by its two legs 51, 52 on the two pivot levers 11, 12 of the front pair of articulated levers 1 in such a manner that said pivot levers are stabilized in their position forming a reflex angle β.

The preceding observations and explanations were always based on an acute angle α which is enclosed by the two pivot levers 11, 12 of the front pair of articulated levers 1 when the cushion carrier T is in its use position, and which is transformed into a reflex angle β when the cushion carrier T is folded into an essentially upright position in front of the backrest R, with the reflex angle β being just a few degrees above the limit angle of 180°. Of course, the observation may also take as a starting point the reflex angle which is adjacent to the acute angle α and which is initially enclosed by the two pivot levers 11, 12 of the front pair of articulated levers 1 and which is transformed, when the cushion carrier T is folded upward into an essentially upright position, into an acute angle (adjacent to the reflex angle β) which is somewhat less than 180°.

The crucial point is that an acute or reflex angle (depending on the approach), which is initially enclosed by the two pivot levers 11, 12 of the front pair of articulated levers 1 is transformed, when the seat cushion T is folded upward, into an obtuse or acute angle, i.e. an initially acute angle into a reflex angle and an initially reflex angle into an acute angle. The effect which can be achieved by this is that, owing to the arrangement of the individual joints 10, 13, 14 of the front pair of articulated levers 1 and of the pivot axis 20 of the cushion carrier T, the arrangement overall is fixed or clamped in such a manner that the cushion carrier T is held in its upright position.

As an alternative or in addition to the transforming of an initially acute angle α between two pivot levers 11, 12 of the front pair of articulated levers 1 into a reflex angle β, provision may be made to guide the knee joint 10 of the front pair of articulated levers 1 in a slotted guide mechanism which has a point of discontinuity (for example by bending) immediately before the sought-for, folded upward (upright) position of the cushion carrier T is reached, and can be configured in accordance with the keyhole principle or interacts with the joint guided therein in the manner in the manner of a bayonet catch, so that, in the folded upward state of the cushion carrier, the joint 10 is received in a region of the slotted guide mechanism on the far side of the point of discontinuity. The pair of articulated levers 1 is therefore stabilized in a certain position and the cushion carrier T is held in an upright, folded upward position. This will be explained in more detail further below with reference to FIGS. 4 and 5.

Figure 3:
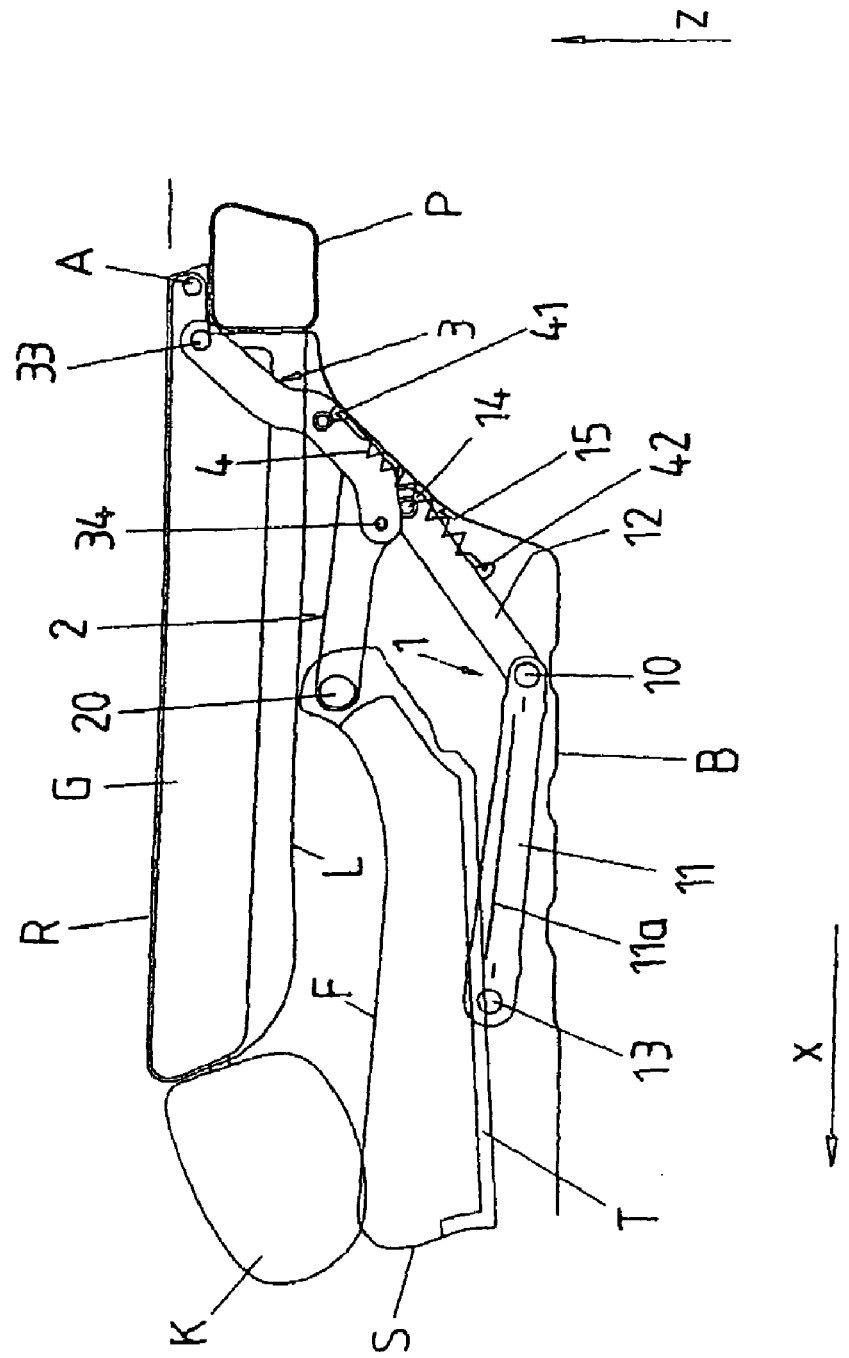
FIG. 3 shows the motor vehicle seat from FIG. 1 after the backrest has been folded forward in the direction of the seat surface.

FIG. 3 shows the vehicle seat from FIG. 1 in a state in which the backrest R is folded forward in the direction of the seat surface F defined by the seat cushion S. This folding forward takes place in a known manner by pivoting the backrest R about its pivot axis A. Owing to the coupling of the backrest R to the rear pivot lever 2 of the cushion carrier T, which pivot lever at the same time also forms the pivot axis 20 thereof, a pivoting movement of the rear pivot lever 2 about its joint 24 on the floor side takes place here, with the pivot axis 20 of the cushion carrier T, which pivot axis is provided at the other end of the rear pivot lever 2, being lowered toward the floor subassembly B, with simultaneous movement forward in the seat longitudinal direction x, away from the backrest R. This is associated with a corresponding pivoting movement of the primary pivot lever 11 of the front pair of articulated levers 1, which leads to a lowering of the front edge of the cushion carrier T. By the combined movement of the rear pivot lever 2 (and the associated lowering of the pivot axis 20 at the rear end of the cushion carrier T) and of the primary pivot lever 11 of the front pair of articulated levers 1 (and the associated lowering of the front edge of the cushion carrier T), the cushion carrier T as a whole is lowered when the backrest R is folded forward in the direction of the seat surface F.

By this means, maximum storage space is available above the folded-forward backrest R of the motor vehicle seat.

Figure 4:
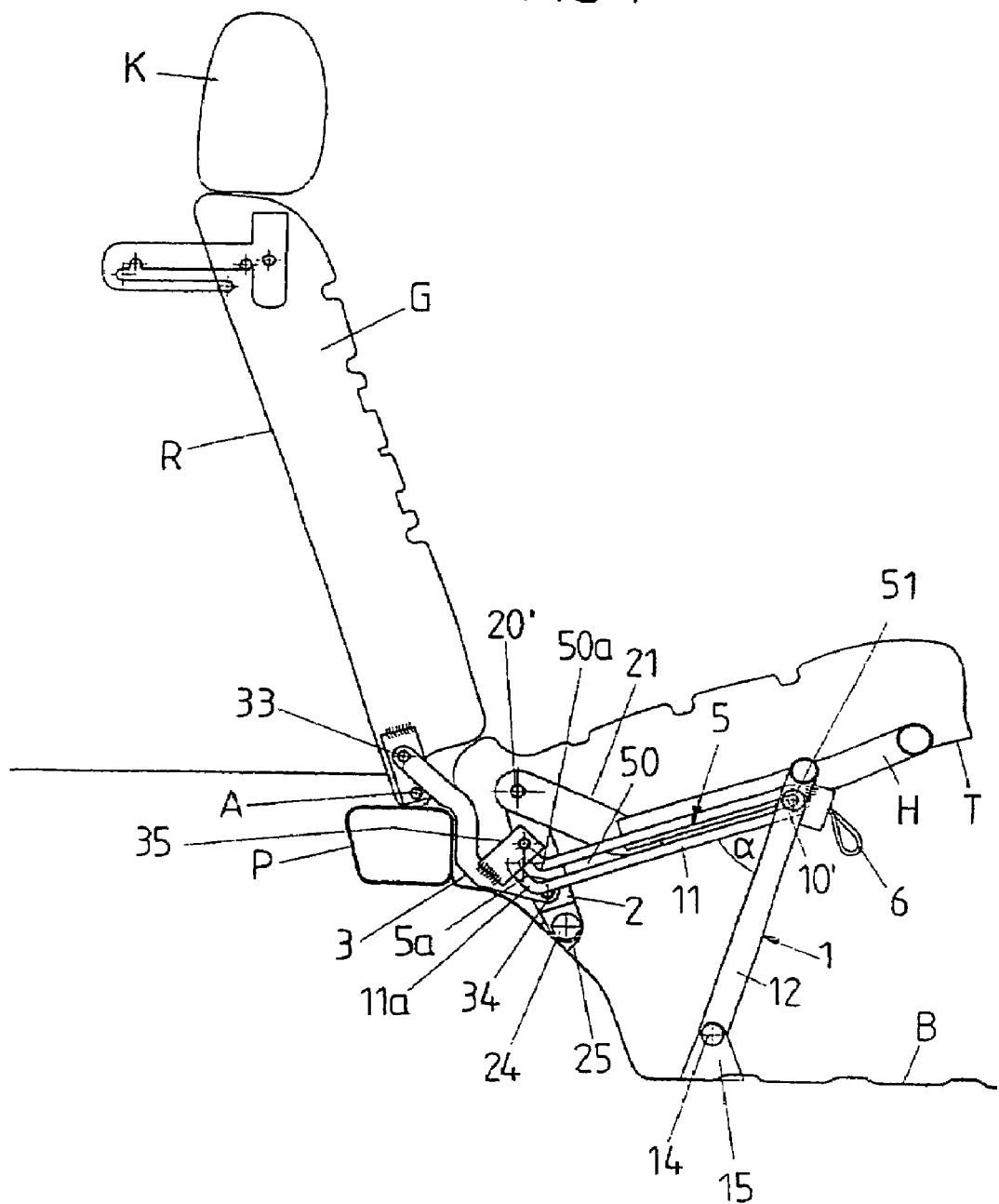
FIG. 4 shows a modification of the motor vehicle seat from FIG. 1 in its use position.

FIG. 4 illustrates a modification of the motor vehicle seat from FIG. 1 in which the primary pivot lever 11 of the front pair of articulated levers 11, 12 is not coupled pivotably to the cushion carrier T of the vehicle seat but rather, on the contrary, is arranged rigidly on a holder H provided on the cushion carrier T, i.e. is connected to said holder or is integrally formed thereon.

A guide slot 5 which is formed by an angled elongated hole 50 runs along the primary pivot lever 11 and extends between two end stops 51, 52, and the second end stop 52 of which is formed in the form of a bend in the guide slot 5 to the rear of a point of discontinuity 50a. To the rear of this bend 50a, an angled end section 5a of the guide slot 5 runs in an angled section 11a of the primary pivot lever 11 as far as the second end stop 52 there.

The knee joint 10', via which the primary pivot lever 11 and the secondary pivot lever 12, which is coupled to a floor subassembly B of the motor vehicle by a joint 14 on the floor side and a bearing bracket 15, is designed in the present case as a guide element in the form of a guide bolt which protrudes from the secondary pivot lever 12 and is guided in the guide slot 5, formed by an angled elongated slot 50, of the primary pivot lever 11. In the use position of the motor vehicle seat that is illustrated in FIG. 4, the guide element 10' forming the knee joint bears against the first stop 51 of the elongated hole 50 extending as a guide slot 5 in the primary pivot lever 11.

Figure 5:
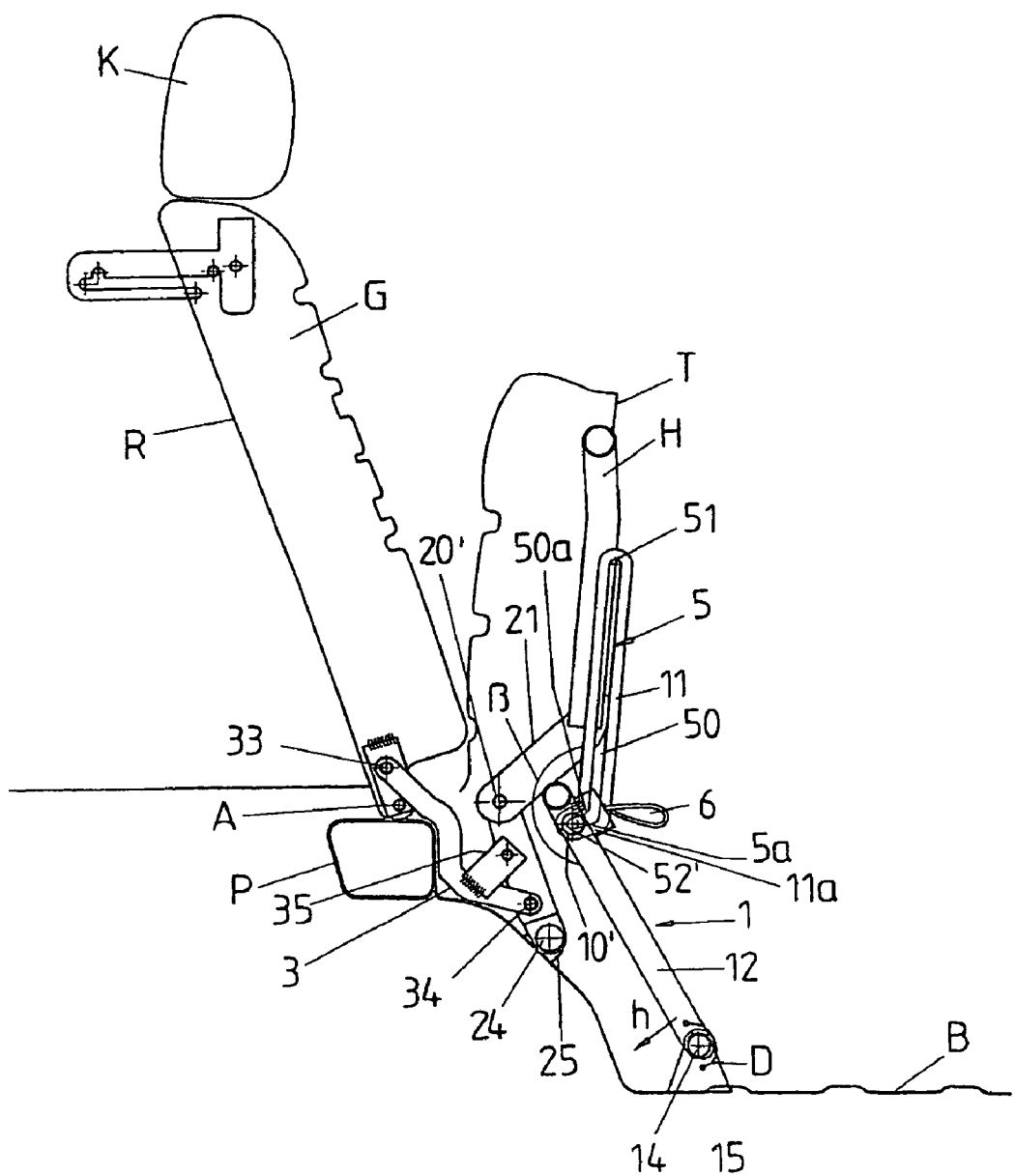
FIG. 5 shows the motor vehicle seat from FIG. 4 after the cushion carrier has been folded upward in front of the backrest.

If by carrying out the cinema chair function already explained above with reference to FIGS. 1 to 3, i.e. by folding the cushion carrier T upward in front of the backrest R of the motor vehicle seat, the motor vehicle seat illustrated in FIG. 4 is transferred into the more compact state illustrated in FIG. 5, then the guide element 10' forming the knee joint migrates in this case along the guide slot 5, which is formed by the elongated hole 50, of the primary locking element 11 as far as the second stop 52 situated in the angled end section 5a of the guide slot 5 to the rear of the bend 50a.

By the guide element 10' striking against the second stop 52 of the guide slot 5, the folding of the cushion carrier T upward, which—as in the exemplary embodiment illustrated with reference to FIGS. 1 and 2—corresponds to a pivoting movement about a pivot axis 20' defined by the rear pivot lever 2, is ended. In the present case, in order to form the pivot axis, the rear pivot lever 2 is connected in an articulated manner to the cushion carrier T via an extension 21 arranged rigidly on the cushion carrier 1 (more precisely on a seat side part). As also in the case of the exemplary embodiment illustrated with reference to FIGS. 1 and 2, an acute angle α, which was originally enclosed by the two pivot levers 11, 12 of the front pair of articulated levers 1, is transformed into a reflex angle β.

The cushion carrier T is secured in this state against folding forward in the direction of the use position illustrated in FIG. 4, in particular by the fact that, owing to the point of discontinuity, which is formed by a bend 50a, in the angled guide slot 5, which is designed as an elongated hole 50, it is clamped to the stop 52, which is formed in the angled end section 5a of the guide slot 5, which opposes a return movement of the cushion carrier T into the use position. Expressed in other words, the bent end section 5a, forming the second end stop 52, of the guide slot 5 on the primary pivot lever 11 is designed in such a manner that weights F, compare with FIG. 5, acting on the cushion carrier T in the direction of the cushion carrier T folding forward cannot free the guide element 10', which is held between the bend 50a and the end stop 52, arranged behind it, of the guide slot 5, from the end position in which it is clamped between the bend 50a and end stop 52. That is to say, weights which are introduced via the cushion carrier T and therefore also via the primary locking element 11 because of the inherent weight of the cushion carrier T do not lead, because of the geometry of the guide slot 5, to the cushion carrier T being folded back into the use position illustrated in FIG. 4. A return of the cushion carrier into the use position on account of the weights acting on the folded upward cushion carrier is therefore prevented. On the contrary, to fold the cushion carrier T back into the use position, a corresponding force has to be exerted on the secondary pivot lever 12 on which an actuating element 6 in the form of a loop is arranged for this purpose.

In order to fix the guide element 10' between the point of discontinuity or bend 50a and the second end stop 52 of the guide slot 5, furthermore, as indicated in FIG. 5, an elastic element, designed, for example, as a torsion spring D, can be provided, the elastic element prestressing the secondary pivot lever 12 of the front pair of articulated levers 1 in a direction h which is opposite to that direction along which the secondary pivot lever 12 would have to be moved in order to bring the cushion carrier T into the use position illustrated in FIG. 4. In addition, the elastic element in the form of a torsion spring D can serve as protection against rattling.

With regard to further details and components of the motor vehicle seat illustrated in FIGS. 4 and 5, reference is made to the explanation for the corresponding components, provided with the same reference numbers, of the motor vehicle seat explained with reference to FIGS. 1 to 3, in the present case the coupling lever 3 additionally being connected in an articulated manner via an extension 35, which protrudes rigidly from it, to the rear pivot lever 2.

The invention claimed is:

1. A motor vehicle, comprising:
   a backrest operable to be brought into an upright use position to form a support for a seat user's back;
   a pivotably mounted cushion carrier for a seat cushion which, in its use position, defines a seat surface for a seat user;
   a folding mechanism for folding over the cushion carrier to a folded position in front of the backrest, so that the cushion carrier essentially extends along the backrest when the backrest is in its upright use position;
   wherein the folding mechanism comprises a pair of levers connected to each other in an articulated manner at a knee joint, the pair of levers enclosing an acute angle at the knee joint;
   wherein, when the cushion carrier is folded over from the use position to the folded position in front of the backrest, the acute angle is transformed into a reflex angle; and
   wherein, when the reflex angle of greater than 180° is achieved, a further increase of the angle is prevented by the folding mechanism.

2. A motor vehicle seat comprising:
   a backrest operable to be brought into an upright use position to form a support for a seat user's back;
   a pivotably mounted cushion carrier for a seat cushion which, in its use position, defines a seat surface for a seat user;
   a folding mechanism for folding over the cushion carrier to a folded position in front of the backrest, so that the cushion carrier essentially extends along the backrest when the backrest is in its upright use position;
   wherein the folding mechanism comprises a pair of levers connected to each other in an articulated manner at a knee joint, the pair of levers enclosing an acute angle at the knee joint; and
   wherein, when the cushion carrier is folded over from the use position to the folded position in front of the backrest, the acute angle is transformed into a reflex angle by going beyond a neutral annular position of 180°.

3. The motor vehicle seat as claimed in claim 2, comprising means for limiting an adjustment path of at least one lever of the pair of levers during the folding over of the cushion carrier and which, when a predeterminable angle between the two levers of the pair of levers is reached, the means for limiting oppose a further movement of the at least one lever, which would otherwise lead to an enlargement of the angle.

4. The motor vehicle seat as claimed in claim 3, wherein the means for limiting the adjustment path are formed by a stop.

5. The motor vehicle seat as claimed in claim 4, wherein the stop limits a movement of one lever of the pair of articulated levers, the lever interacting with the stop configured to be coupled to a floor subassembly of a motor vehicle.

6. The motor vehicle seat as claimed in claim 5, wherein the stop is provided on one of a floor subassembly of the motor vehicle and on one lever of the pair of articulated levers.

7. The motor vehicle seat as claimed in claim 6, wherein the stop is formed on the guide device on one lever of the pair of levers, and wherein the other lever of the pair of levers is guided in the guide device.

8. The motor vehicle seat as claimed in claim 7, wherein the other lever is guided in the guide device by a guide element forming the knee joint of the pair of levers.

9. The motor vehicle seat as claimed in claim 7, wherein the stop is formed on an angled end section of the guide device.

10. The motor vehicle seat as claimed in claim 2, wherein the pair of levers is formed by two levers, wherein one of the levers is arranged on the cushion carrier and the other is to be coupled pivotably to a floor subassembly of a motor vehicle.

11. The motor vehicle seat as claimed in claim 10, wherein the lever arranged on the cushion carrier is one of coupled pivotably to the cushion carrier and is attached rigidly to the cushion carrier.

12. The motor vehicle seat as claimed in claim 10, wherein coupling points of the pair of levers on the cushion carrier and on the floor subassembly, respectively, and the knee joint of the pair of levers are arranged in such a manner with respect to a pivot axis about which the cushion carrier is foldable that, when the reflex angle is present between the pair of levers, the arrangement of the coupling points and of the knee joint opposes a pivoting movement of the cushion carrier about its pivot axis, which would otherwise lead to the cushion carrier folding back into the use position.

13. The motor vehicle seat as claimed in claim 2, wherein, in the folded position of the cushion carrier, a stop surface of one lever of the pair of levers bears against the cushion carrier and thereby opposes a folding of the cushion carrier forward.

14. The motor vehicle seat as claimed in claim 2, wherein an actuating element is arranged on one lever of the pair of levers, wherein by actuation of the actuating element, the reflex angle between the two levers of the pair of levers is transferable into the acute angle in order to allow the folding back of the cushion carrier into the use position.

15. The motor vehicle seat as claimed in claim 2, wherein elastic means are provided which oppose a resetting movement of the cushion carrier from its folded position, into its use position.

16. The motor vehicle seat as claimed in claim 15, wherein the elastic means act on at least one of the levers of the pair of levers.

17. The motor vehicle seat as claimed in claim 16, wherein the elastic means are arranged on the knee joint of the pair of levers.

18. The motor vehicle seat as claimed in claim 17, wherein the elastic means are formed by a torsion spring with two free limbs, each being supported on one of the levers of the pair of levers.

19. The motor vehicle seat as claimed in claim 18, wherein the elastic means act on one lever of the pair of levers.

20. The motor vehicle seat as claimed in claim 16, wherein the elastic means are formed by a linear spring.

21. The motor vehicle seat as claimed in claim 15, wherein sections of at least one of a backrest cushion and the seat cushion serve as elastic means opposing a resetting movement of the cushion carrier from its folded position in front of the backrest.

22. The motor vehicle seat as claimed in claim 2, wherein the knee joint is supported on a floor subassembly when the cushion carrier is in the use position.

23. The motor vehicle seat as claimed in claim 22, wherein, when the cushion carrier is folded over to the folded position, the knee joint is raised from the floor subassembly.

24. The motor vehicle seat as claimed in claim 2, wherein the backrest is forwardly foldable in the direction of the seat surface defined by the cushion carrier.

25. The motor vehicle seat as claimed in claim 24, wherein the backrest is mounted pivotably about an axis.

26. The motor vehicle seat as claimed in claim 2, wherein the pivot axis of the cushion carrier is mounted movably.

27. The motor vehicle seat as claimed in claim 26, wherein the pivot axis of the cushion carrier is arranged on a third lever.

28. The motor vehicle seat as claimed in claim 27, wherein the third lever is coupled pivotably with one end to the cushion carrier at a coupling point, and wherein at the coupling point the third lever forms the pivot axis of the cushion carrier.

29. The motor vehicle seat as claimed in claim 28, wherein the third lever is to be coupled with its other end to a floor subassembly of a motor vehicle.

30. The motor vehicle seat as claimed in claim 24,
    wherein the pivot axis of the cushion carrier is moveably mounted,
    wherein the pivot axis of the cushion carrier is arranged on a third lever,
    wherein the third lever is coupled pivotably with one end to the cushion carrier at a coupling point, and wherein at the coupling point the third lever forms the pivot axis of the cushion carrier, and
    wherein the third lever forming the pivot axis of the cushion carrier is operatively connected to the backrest via a coupling lever.

31. The motor vehicle seat as claimed in claim 30, wherein, when the backrest is folded forward in a direction of the seat surface defined by the cushion carrier, the third lever forming the pivot axis of the cushion carrier is actuated by the coupling lever in such a manner that the pivot axis of the cushion carrier is lowered in a direction of a floor subassembly.

32. The motor vehicle seat as claimed in claim 7, wherein the guide device is formed by an elongated hole extended along the one lever of the pair of levers.

33. The motor vehicle seat as claimed in claim 19, wherein the elastic means are formed by a linear spring.

34. The motor vehicle seat as claimed in claim 25,
    wherein the pivot axis of the cushion carrier is moveably mounted,
    wherein the pivot axis of the cushion carrier is arranged on a third lever,
    wherein the third lever is coupled pivotably with one end to the cushion carrier at a coupling point, and wherein at the coupling point the third lever forms the pivot axis of the cushion carrier, and
    wherein the third lever forming the pivot axis of the cushion carrier is operatively connected to the backrest via a coupling lever.

35. The motor vehicle seat as claimed in claim 24,
    wherein the pivot axis of the cushion carrier is moveably mounted,
    wherein the pivot axis of the cushion carrier is arranged on a third lever,
    wherein the third lever is coupled pivotably with one end to the cushion carrier at a coupling point, wherein at the coupling point the third lever forms the pivot axis of the cushion carrier,
    wherein the third lever is to be coupled by with its other end to a floor subassembly of a motor vehicle and
    wherein the third lever forming the pivot axis of the cushion carrier is operatively connected to the backrest via a coupling lever.

36. The motor vehicle seat as claimed in claim 19, wherein the elastic means act on one lever of the pair of levers that is connected in an articulated manner to a floor subassembly.

* * * * *

UNITED STATES PATENT AND TRADEMARK OFFICE
CERTIFICATE OF CORRECTION

PATENT NO. : 7,578,537 B2  Page 1 of 1
APPLICATION NO. : 10/583243
DATED : August 25, 2009
INVENTOR(S) : Harald Baetz It is certified that error appears in the above-identified patent and that said Letters Patent is hereby corrected as shown below:

In the Claims

Column 9, line 51, Claim 2    Delete "annular" replace with -- angular --

Signed and Sealed this

Twenty-eighth Day of September, 2010

David J. Kappos
*Director of the United States Patent and Trademark Office*